United States Patent
Benton et al.

(10) Patent No.: US 11,810,011 B2
(45) Date of Patent: Nov. 7, 2023

(54) GENERATION OF PREDICTIVE MODEL METRICS USING INTERMEDIATE OPERATIONS

(71) Applicant: Red Hat, Inc., Raleigh, NC (US)

(72) Inventors: William Benton, Madison, WI (US); Erik Erlandson, Phoenix, AZ (US)

(73) Assignee: Red Hat, Inc., Raleigh, NC (US)

( * ) Notice: Subject to any disclaimer, the term of this patent is extended or adjusted under 35 U.S.C. 154(b) by 1390 days.

(21) Appl. No.: 15/860,499

(22) Filed: Jan. 2, 2018

(65) Prior Publication Data
US 2019/0205782 A1    Jul. 4, 2019

(51) Int. Cl.
*G06N 7/01*       (2023.01)
*G06N 5/02*       (2023.01)
*G06N 20/00*      (2019.01)
*G06N 5/022*      (2023.01)

(52) U.S. Cl.
CPC .............. *G06N 7/01* (2023.01); *G06N 5/022* (2013.01); *G06N 20/00* (2019.01)

(58) Field of Classification Search
CPC ......... G06N 5/022; G06N 7/005; G06N 20/00
See application file for complete search history.

(56) References Cited

U.S. PATENT DOCUMENTS

| | | |
|---|---|---|
| 7,266,537 B2 | 9/2007 | Jacobsen et al. |
| 7,505,949 B2 | 3/2009 | Grichnik |
| 7,617,010 B2 | 11/2009 | Bocharov et al. |
| 7,971,190 B2 | 6/2011 | Davies et al. |
| 8,533,222 B2 | 9/2013 | Breckenridge et al. |
| 8,745,537 B1* | 6/2014 | Shakeri ..................... G06F 8/34 715/853 |
| 9,188,968 B2 | 11/2015 | Hrischuk et al. |
| 9,672,474 B2 | 6/2017 | Dirac et al. |
| 10,311,222 B2* | 6/2019 | Ranadive ................ G06F 21/34 |

(Continued)

FOREIGN PATENT DOCUMENTS

WO    WO-2017201107 A1 * 11/2017   ............... G06N 5/04

OTHER PUBLICATIONS

How to create Vectors, Factors, Lists, Matrices and Datasets with R Programming taken from https://datascienceplus.com/how-to-create-data-frames-in-r/ (Year: 2017).*

(Continued)

*Primary Examiner* — Benjamin P Geib
(74) *Attorney, Agent, or Firm* — Lowenstein Sandler LLP

(57) ABSTRACT

A model including a plurality of intermediate operations may be identified. An intermediate operation of the plurality of intermediate operations may be selected to provide output values associated with the plurality of intermediate operations during execution of the model. A first output value associated with the intermediate operation may be received during a first execution of the model. A second output value associated with the intermediate operation may be received during a second execution of the model. A difference between the first output value and the second output value may be determined to satisfy a threshold. A notification may be transmitted that indicates data drift of the model in view of the difference between the first output value and the second output value satisfying the threshold.

20 Claims, 11 Drawing Sheets

(56) References Cited

U.S. PATENT DOCUMENTS

2017/0076207 A1* 3/2017 Chipley .............. G06F 3/04817
2017/0206451 A1* 7/2017 Mahler ................. G06N 20/00
2017/0330109 A1* 11/2017 Maughan ................ G06N 5/04

OTHER PUBLICATIONS

The Distance Between Two Vectors taken from http://mathonline.wikidot.com/the-distance-between-two-vectors (Year: 2017).*
Cavalcante, Rodolfo C., Leandro L. Minku, and Adriano Li Oliveira. "Fedd: Feature extraction for explicit concept drift detection in time series." 2016 International Joint Conference on Neural Networks (IJCNN). IEEE, 2016. (Year: 2016).*
Ikonomovska, Elena, et al. "Regression trees from data streams with drift detection." International Conference on Discovery Science. Springer, Berlin, Heidelberg, 2009. (Year: 2009).*
Gama, Joao, and Gladys Castillo. "Learning with local drift detection." International conference on advanced data mining and applications. Springer, Berlin, Heidelberg, 2006. (Year: 2006).*

* cited by examiner

GENERATION OF PREDICTIVE MODEL METRICS USING INTERMEDIATE OPERATIONS

TECHNICAL FIELD

The implementations of the disclosure relate generally to computer systems and, more specifically, relate to the generation of predictive model metrics using intermediate operations.

BACKGROUND

Machine learning is a type of artificial intelligence that automates data processing using algorithms without necessitating the creation of new programs. In other words, machine learning provides data to a computer, and the computer uses that information to analyze future data and learn from experience.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
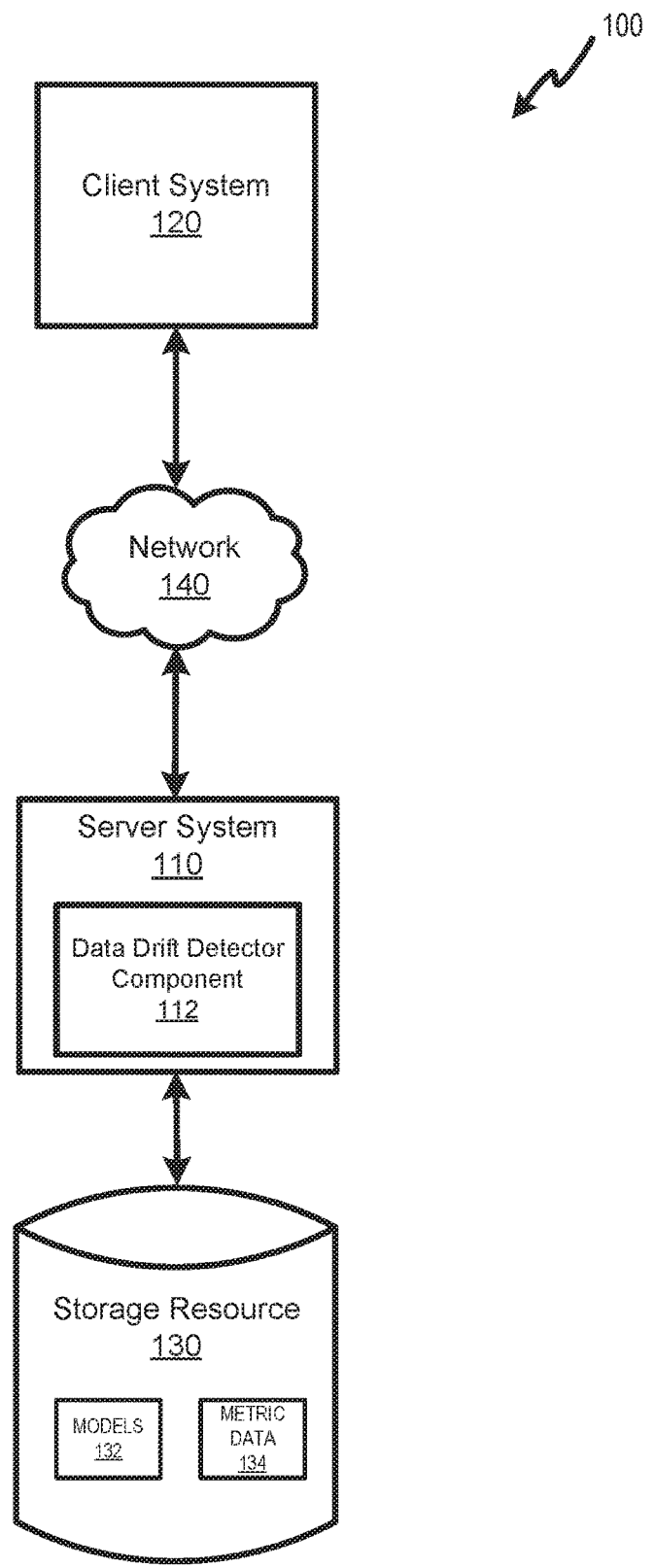
FIG. 1 is a block diagram of a network architecture in which implementations of the disclosure may operate for generating predictive model metrics using intermediate operations.

Described herein are techniques for generating predictive model metrics using intermediate operations. Predictive models may analyze current and historical facts in order to make predictions about future events. A predictive model may include a series of intermediate operations that produce corresponding output values which are then used to generate a final output value. The predictive model may initially be trained using a training set that includes a set of examples used to fit the parameters of the predictive model. For example, the training set may include an input vector and an answer vector that correspond to the expected output value of the predictive model when receiving the input vector. The predictive model may be executed using the training set and the output value may be compared to the expected output value (also referred to as "target value" hereafter) of the training set. Based on the result of the comparison of the output value and the target, parameters and intermediate operations of the predictive model may be adjusted before the predictive model is implemented.

Once the predictive model is implemented to predict real world information, the properties of the target may change over time in unforeseen ways. This may result in data drift, where the predictions produced by the predictive model become less accurate over time. However, because the predictive model is used to make predictions regarding future events, it may be difficult to identify data drift until the predictive model has run for a period of time, which may be months or years. Accordingly, parameters and intermediate operations of the predictive model may not be adjusted in a timely matter to improve the accuracy of the predictive model.

Accordingly, described herein are aspects of generating predictive model metrics using intermediate operations. In an example, a computer system may identify a predictive model that includes a number of intermediate operations. For example, the predictive model may utilize a decision tree that includes a number of decision blocks corresponding to yes or no questions with different paths based on the answers to the yes or no questions, where each decision block may correspond to an intermediate operation. Once the predictive model has been identified, at least one intermediate operation may be selected for monitoring. The computer system may generate an instruction associated with the intermediate operation to provide the output values of the intermediate operation when the predictive model is executed. For example, the computer system may select one of the decision blocks from a decision tree and generate an instruction for the predictive model to provide the output values for that particular decision block when the predictive model is executed. Subsequently, each time the predictive model is executed the predictive model will provide the output value (e.g., a yes or a no) for that selected intermediate operation. In one implementation, the predictive model may provide the output value to the computer system.

After selecting an intermediate operation, a training set may be run on the predictive model and a first output value for the intermediate operation may be provided to the computer system. Then, the predictive model may be implemented and executed using live information from the real world. After implementation, the predictive model may provide a second output value of the intermediate operation to the computer system. Subsequently, the computer system may determine a difference between the first output value from the training set and the second output value from the implemented predictive model. If the difference between the first output value and the second output value satisfies a threshold, then the predictive model may be experiencing data drift. Upon determining the difference between the first and second output values satisfies the threshold, the computer system may transmit a notification that indicates the difference satisfies the threshold and that the predictive model may be experiencing data drift. For example, the computer system may transmit the notification to a system administrator or owner of the predictive model, allowing the system administrator to take appropriate action in adjusting the predictive model to reduce or eliminate the data drift.

Thus, the aspects of the present disclosure may be advantageous by identifying data drift of a predictive model in a timely fashion to ensure that future predictions made by the prediction model are accurate. By identifying data drift more quickly, adjustments can be made to the predictive model earlier in the implementation process, improving the performance, efficiency and accuracy of the predictive model of the computer system.

FIG. 1 illustrates an example system architecture 100 in which implementations of the disclosure may operate. The system architecture 100 may include a server system 110 and a client system 120 via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Any number of client systems 120 may access the server system 110. The client system 120 may include one or more processors communicatively coupled to memory devices and input/output (I/O) devices. The client system 120 may be a computing device such as a server computer, a desktop computer, a set-top box, a gaming console, a television, a portable computing device such as, and not limited to, mobile telephones, personal digital assistants (PATS), portable media players, netbooks, laptop computers, an electronic book reader and the like.

The server system 110 may be hosted by a computer system (described in more detail below with reference to FIG. 11) and include one or more computer programs executed by the computer system for centralized management of the system architecture 100. In some implementations, the server system 110 may be a distributed file system that includes multiple computing systems communicatively coupled to one another. The server system 110 includes data drift detection functionality that provides notifications and metric data associated with predictive models. In one example, server system 110 may include a data drift detector component 112 and storage resource 130. Storage resource 130 may store predictive models 132 and metric data 134 of the server system 110. The server system 110 may perform various operations associated with the models 132 and metric data 134, as will be discussed in more detail below.

The data drift detector component 112 may select intermediate operations of one or more of models 132. The data drift detector component 112 may also receive the output values of the selected intermediate operations and determine whether a difference between the output values satisfies a threshold. The data drift detector component 112 may generate a notification that indicates data drift of the model in view of the difference between the output values satisfying the threshold and provide the notification to the client system 120. For example, the data drift detector component 112 may provide the notification as an email or text message to the client system 120. The data drift detector component 112 may also generate metric data 134 associated with one or more of models 132 and provide the metric data 134 to the client system 120 via a user interface, as will be discussed in more detail below.

Figure 2:
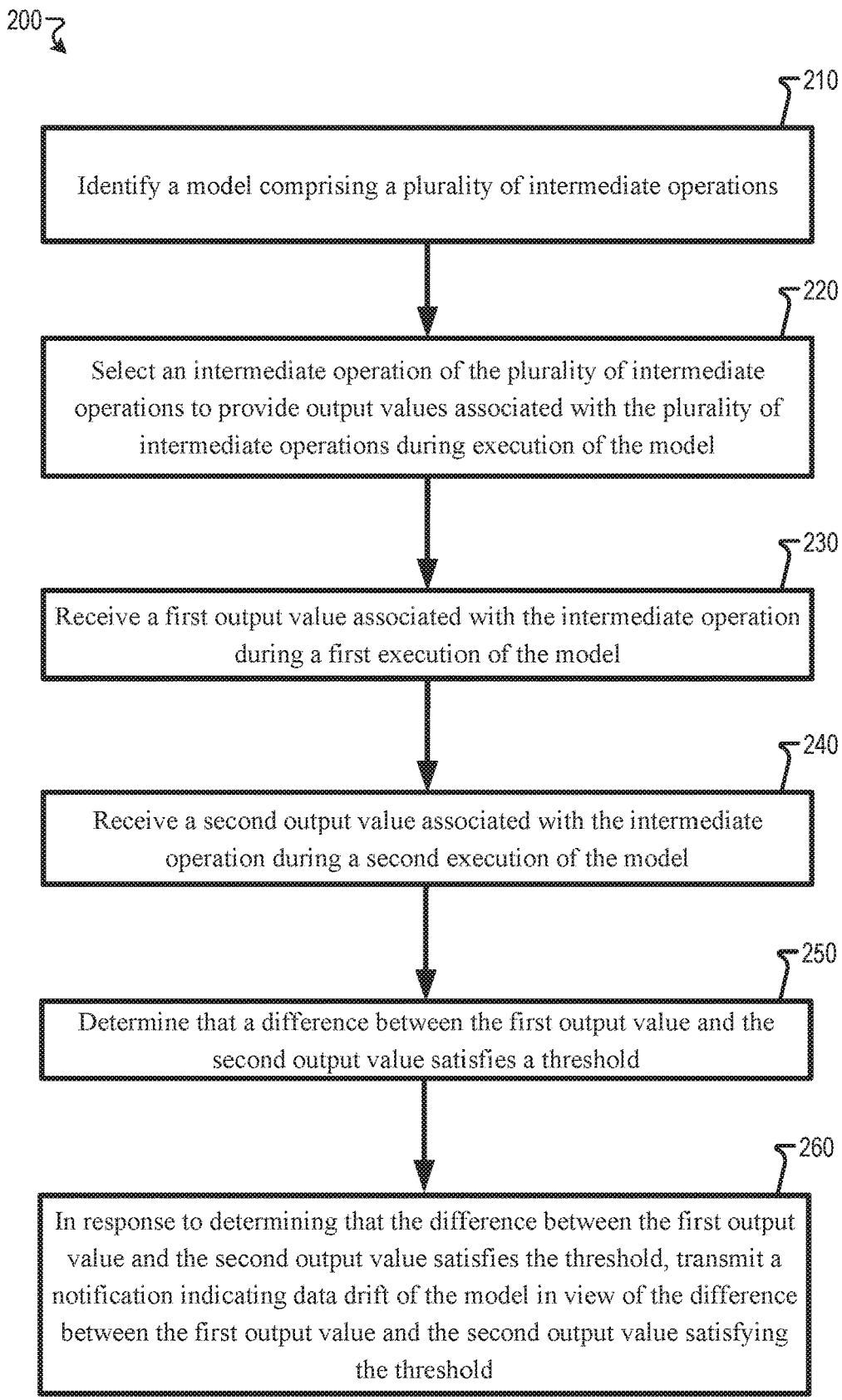
FIG. 2 depicts a flow diagram of an example method to select an intermediate operation of a predictive model for the identification of data drift according to an implementation of the disclosure.

FIG. 2 depicts a flow diagram of an example method 200 to select an intermediate operation of a predictive model for the identification of data drift. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by the data drift detector component 112 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a processing device of a server system identifying a model that includes a plurality of intermediate operations (block 210). For example, the processing device may identify a decision tree model that includes a number of decision blocks (e.g., intermediate operations). After identifying the model, the processing device may select an intermediate operation of a plurality of intermediate operations to provide output values associated with the plurality of intermediate operations during the execution of the model (block 220). For example, the processing device may select a particular decision block of a decision tree model. In some implementations, the processing device may modify the source code of the selected intermediate operation of the model to provide output values of the selected intermediate operation. For example, the processing device may modify the source code of the particular decision block to provide output values (e.g., yes or no) of the particular decision block. Accordingly, whenever the particular decision block is executed, it may provide the output value.

Subsequently, the processing device may receive a first output value associated with the intermediate operation during a first execution of the model (block 230). For example, the processing device may receive a yes or no output value of the particular decision block during a first execution of the decision tree model. In one implementation, the first execution of the model may correspond to an execution of a training set on the model. The processing device may then receive a second output value associated with the intermediate operation during a second execution of the model (block 240). For example, the processing device may receive a second yes or no output value of the particular decision block during a second execution of the decision tree model. In some implementations, the second execution of the model may correspond to an execution of the model after the model has been implemented. Accordingly, the second output value may correspond to a real world (e.g., actual) value.

After receiving the output values, the processing device may determine that a difference between the first output value and the second output value satisfies a threshold (block 250). In one implementation, the difference may satisfy the threshold if the difference is less than or equal to the threshold. In another implementation, the difference may satisfy the threshold if the difference is greater than or equal to the threshold. For example, if an expected (e.g., target) number of yes output values for a decision block during execution of a training set is 150 and the actual number of yes output values for the decision block during implementation is 50 and the threshold is 50, then the difference between the first output value (e.g., 150) and the second output value (e.g., 50) may satisfy the threshold (e.g., 50). In one implementation, the processing device may generate a first vector that is associated with the first output value and a second vector that is associated with the second output value. The processing device may then determine a distance (e.g., difference) between the first vector and the second vector satisfies a threshold. In some implementations, the processing device may determine a probability value associated with the first output value and the second output value satisfies a threshold. For example, if the probability of the second output value occurring based on the first output value is 1 in 1,000,000 and the threshold is 1 in 100, then the probability may satisfy the threshold.

In further implementations, the processing device may determine a type of the intermediate operation. The processing device may then determine the threshold in view of the type of the intermediate operation (e.g., different types of intermediate operations may be assigned different threshold values). For example, if the intermediate operation is a decision block then the processing device may determine the threshold is the difference between the target values and actual values of the decision block.

Once the processing device has determined that the difference between the first output value and the second output value satisfies the threshold, the processing device may transmit a notification indicating data drift of the model in view of the difference between the first output value and the second output value satisfying the threshold (block 260). In one implementation, the processing device may identify an owner, such as a system administrator, of the model and transmit the notification to the owner. For example, the processing device may transmit an email or text message to a client device associated with the owner of the model. In some implementations, the processing device may select multiple intermediate operations of the model to provide output values. For example, a second intermediate operation of the model may be selected to provide output values in addition to the first intermediate operation.

Figure 3:
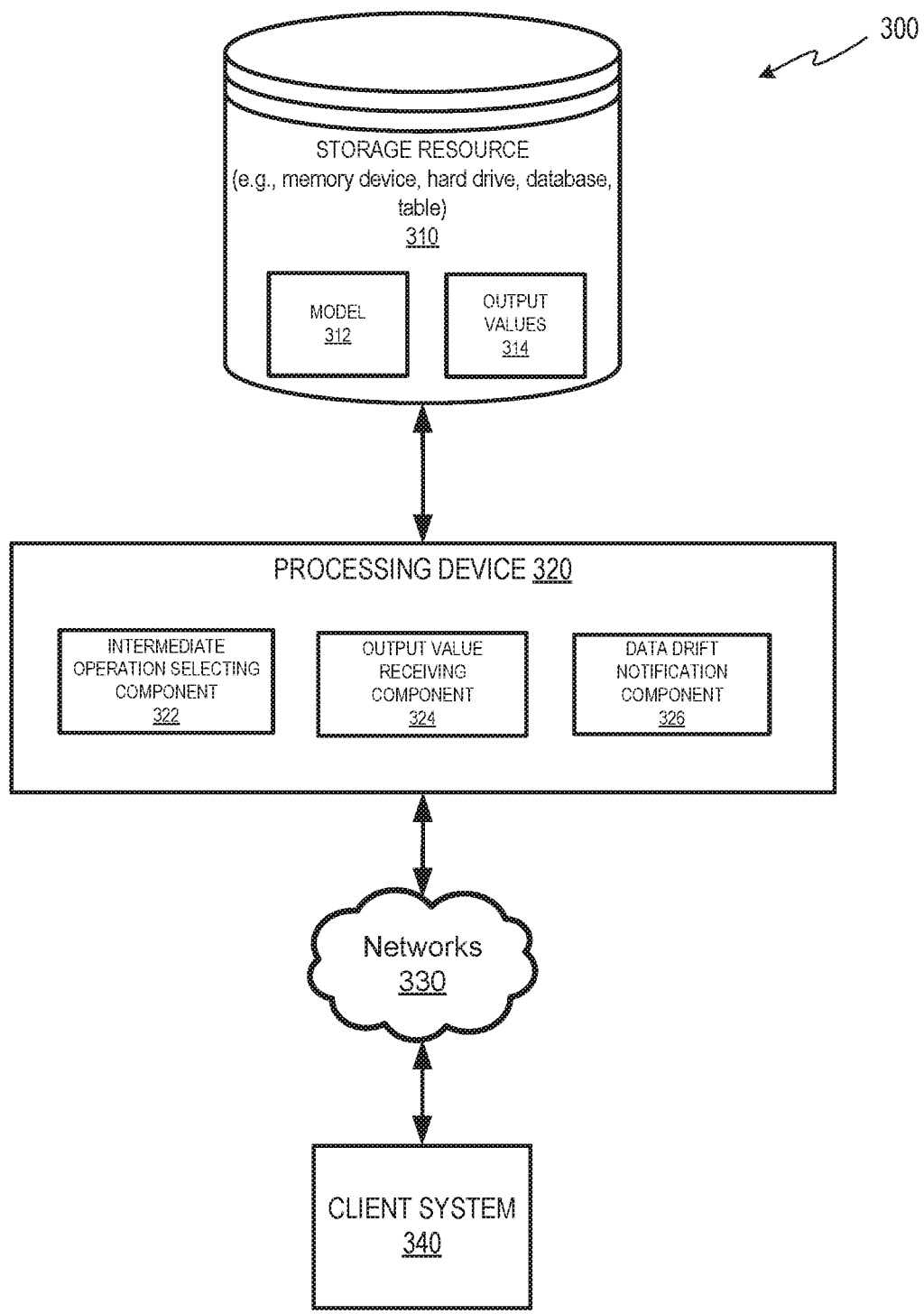
FIG. 3 illustrates an example apparatus in which implementations of the disclosure may operate

FIG. 3 illustrates an example apparatus 300 in which implementations of the disclosure may operate. The apparatus 300 may be the same or similar to one of the distributed computing system, a network, or other computing devices. The storage resource 310 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 310 may store information, (such as model 312 and output values 314). The processing device 320 may be communicatively coupled to a client system 340 via a network 330. The client system 340 and the network 330 may correspond to client system 120 and network 140 of FIG. 1, respectively.

The apparatus 300 may include a processing device 320. The processing device 320 may include an intermediate operation selecting component 322, an output value receiving component 324, and a data drift notification component 326.

The intermediate operation selecting component 322 may select the intermediate operation of the model to provide output values. In some implementations, the intermediate operation selecting component 322 may select multiple intermediate operations of the model to provide output values. In other implementations, the intermediate operation selecting component 322 may modify the source code of the selected intermediate operation to provide output values. The output value receiving component 324 may receive the output values for the intermediate operations. The output value receiving component 324 may also store the output values on storage resource 310. The data drift notification component 326 may generate and transmit a notification indicating data drift of the model in view of the difference between output values of an intermediate operation satisfying a threshold. The data drift notification component 326 may also identify the owner of the model and provide the notification to a client device (e.g., client system 340) associated with the owner of the model.

Figure 4:
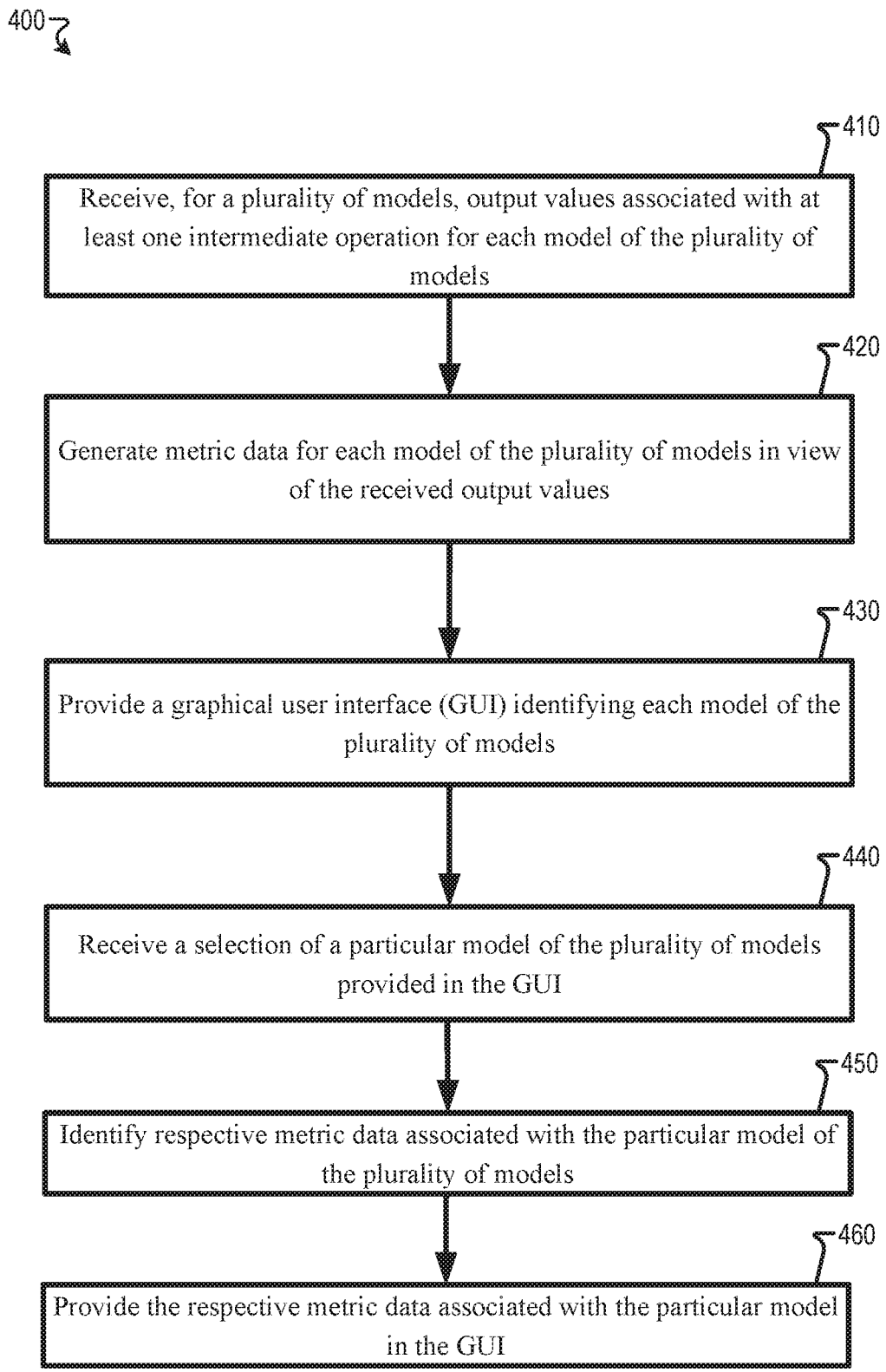
FIG. 4 depicts a flow diagram of an example method to generate and provide metric data of a particular model via a graphical user interface according to an implementation of the disclosure.

FIG. 4 depicts a flow diagram of an example method 400 to generate and provide metric data of a particular model via a graphical user interface. The method 400 may be performed by a processing device that may include hardware (e.g., processing logic, circuitry, dedicated logic, programmable logic, microcode, etc.), software (e.g., instructions run or executed on a processing device), or a combination thereof. In general, the method 400 may be performed by the data drift detector component 112 of FIG. 1.

Method 400 may begin with a processing device receiving, for a plurality of models, output values associated with at least one intermediate operation for each model of the plurality of models (block 410). For example, the processing device may receive output values for selected intermediate operations of the plurality of models as previously discussed in FIG. 2. Upon receiving the output values, the processing device may generate metric data for each model in view of the received output values (block 420). The metric data may correspond to determined values that indicate the accuracy and performance of each model. In some implementations, the information included in the metric data may be determined in view of a type of the model. For example, the metric data for a first type of model may include a first set of information, while the metric data for a second type of model may include a second set of information that is different than the first set of information. In another implementation, generating the metric data may include generating a vector that is associated with the received output values for a corresponding model. In implementations, the generated metric data may include a probability value that is associated with the received output values for a corresponding model. In a further implementation, the generated metric data may include presenting the operational status of a particular model within the GUI. For example, the GUI may indicate that a particular model is currently being executed.

Subsequently, the processing device may provide a graphical user interface (GUI) identifying each model of the plurality of models (block 430). For example, the processing device may provide the GUI to a client device, such as client system 120 of FIG. 1. The GUI may consist of selectable icons, drop down menus, identifiers or the like to identify the individual models that have generated metric data. The processing device may then receive a selection of a particular model of the plurality of models that is provided in the GUI (block 440). For example, a client device may select a particular model from a drop down menu presented in the GUI. In some implementations, the processing device may authenticate the client device associated with the selection of the particular model. For example, the processing device may authenticate the client device by determining the client device is associated with an owner of the particular model that was selected. Upon receiving the selection, the processing device may identify respective metric data associated with the particular model selected at block 440 (block 450). For example, the processing device may identify the respective metric data stored on a storage resource. The processing device may then provide the respective metric data associated with the particular model in the GUI (block 460). In one implementation, the processing device may cause the metric data to be displayed in the GUI by a client device.

Figure 5:
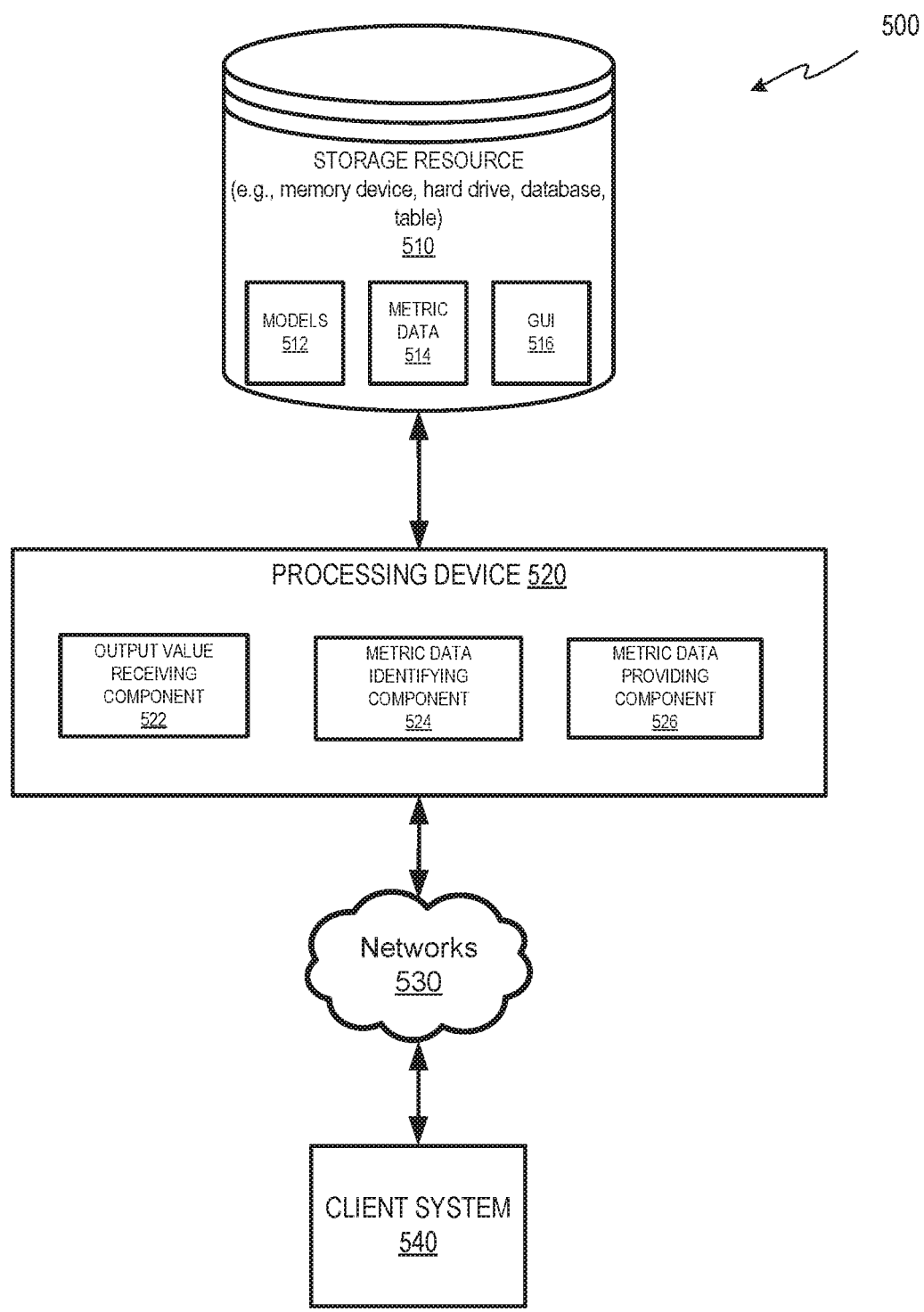
FIG. 5 illustrates an example apparatus in which implementations of the disclosure may operate.

FIG. 5 illustrates an example apparatus 500 in which implementations of the disclosure may operate. The apparatus 500 may be the same or similar to one of the distributed computing system, a network, or other computing devices. The storage resource 510 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 510 may store information, (such as models 512, metric data 514 and GUI 516). The processing device 520 may be communicatively coupled to a client system 540 via a network 530. The client system 540 and the network 530 may correspond to client system 120 and network 140 of FIG. 1, respectively.

The apparatus 500 may include a processing device 520. The processing device 520 may include an output value receiving component 522, a metric data identifying component 524, and a metric data providing component 526.

The output value receiving component 522 may receive output values from a plurality of models. The output value receiving component 522 may also store the output values on storage resource 510. The metric data identifying component 524 may identify metric data (e.g., metric data 514) corresponding to a particular model and retrieve the metric data from storage resource 510. The metric data providing component 526 may provide the metric data that is identified and retrieved by the metric data identifying component 524 in the GUI.

Figure 6:
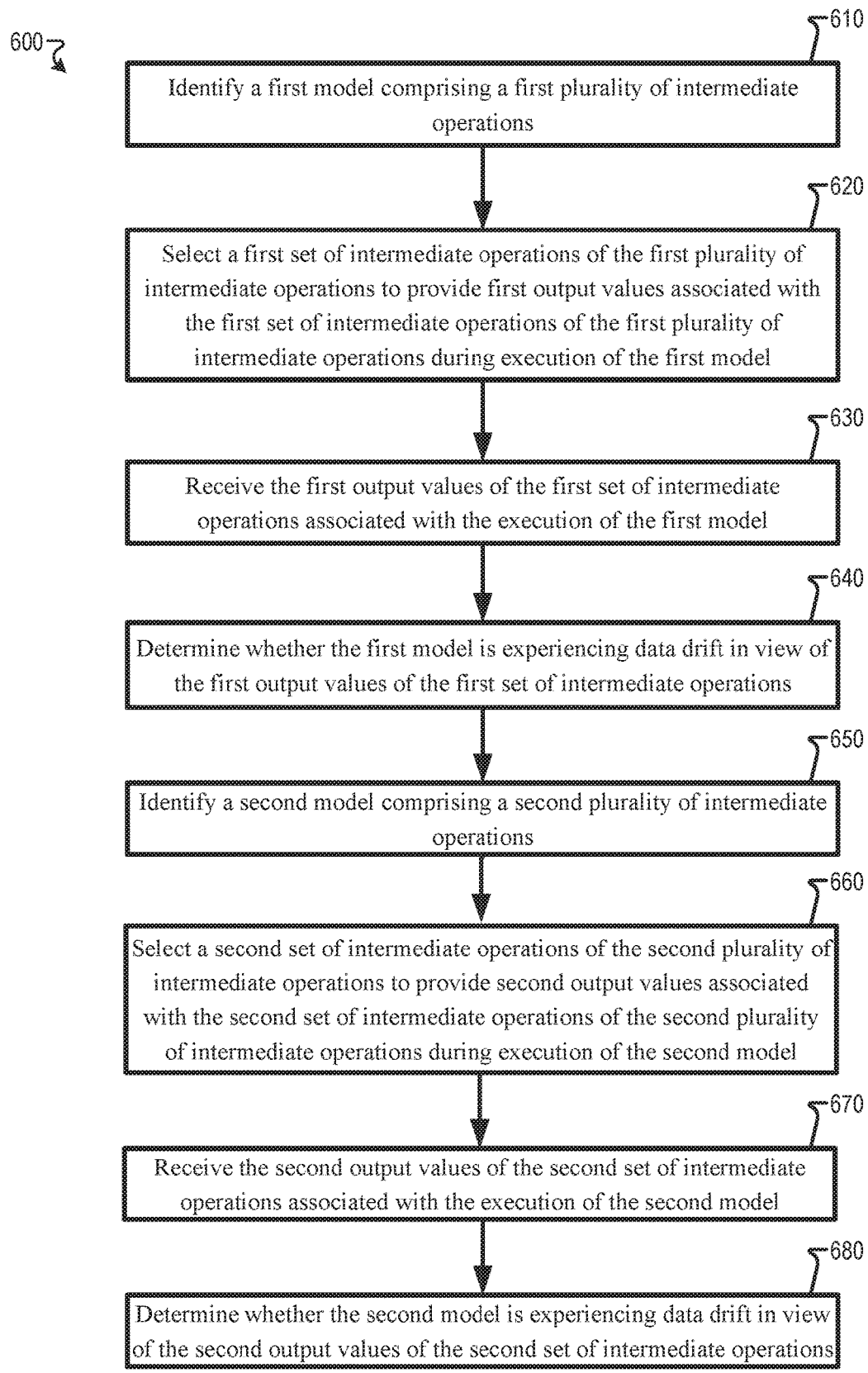
FIG. 6 depicts a flow diagram of an example method to select intermediate operations of multiple predictive models for the identification of data drift according to implementations of the disclosure.

FIG. 6 depicts a flow diagram of an example method 600 to select intermediate operations of multiple predictive models for the identification of data drift. The method 600 may be performed by a processing device that may include hardware (e.g., processing logic, circuitry, dedicated logic, programmable logic, microcode, etc.), software (e.g., instructions run or executed on a processing device), or a combination thereof. In general, the method 600 may be performed by the data drift detector component 112 of FIG. 1.

Method 600 may begin with a processing device identifying a first model that includes a first plurality of intermediate operations (block 610). For example, the processing device may identify a decision tree model that includes a number of decision blocks (e.g., intermediate operations). After identifying the model, the processing device may select a first set of intermediate operations of a first plurality of intermediate operations to provide output values associated with the first plurality of intermediate operations during the execution of the first model (block 620). For example, the processing device may select a particular decision block of the number of decision blocks of a decision tree model. In some implementations, the processing device may modify the source code of the selected intermediate operation of the model to provide output values of the selected intermediate operation. For example, the processing device may modify the source code of the particular decision block to provide output values (e.g., yes or no) of the particular decision block. In one implementation, the processing device may select particular intermediate operations in view of a category of the model. For example, if the model is a decision tree model the processing device may select one or more decision blocks of the decision tree model.

Subsequently, the processing device may receive the first output values of the first set of intermediate operations associated with the execution of the first model (block 630). For example, the processing device may receive yes or no output values of the particular decision block during the execution of the decision tree model. In one implementation, the execution of the first model may correspond to an execution of a training set on the first model. In other implementations, the execution may correspond to an execution of the first model after it has been implemented. Accordingly, the first output values may include both target output values from the training set and actual output values received after implementation of the first model. The processing device may then determine whether the first model is experiencing data drift in view of the first output values of the first set of intermediate operations (block 640). For example, the processing device may determine the first model is experiencing data drift in view of a different between the first output values satisfying a threshold. In one implementation, the processing device may determine the threshold in view of a type of the first set of intermediate operations. In some implementations, the processing device may transmit a notification indicating the first output values satisfy the threshold.

The processing device may then identify a second model that includes a second plurality of intermediate operations (block 650). For example, the processing device may identify a model corresponding to the health of a network. After identifying the model, the processing device may select a second set of intermediate operations of the second plurality of intermediate operations to provide output values associated with the second plurality of intermediate operations during the execution of the second model (block 660). In one implementation, the second set of intermediate operations may be different than the first set of intermediate operations selected at block 620. Subsequently, the processing device may receive the second output values of the second set of intermediate operations associated with the execution of the second model (block 670). In one implementation, the execution of the second model may correspond to an execution of a training set on the second model. In other implementations, the execution may correspond to an execution of the second model after it has been implemented. Accordingly, the second output values may include both target output values from the training set and actual output values received after implementation of the second model. The processing device may then determine whether the second model is experiencing data drift in view of the second output values of the second set of intermediate operations (block 680). For example, the processing device may determine the second model is experiencing data drift in view of a different between the second output values satisfying a threshold. In some implementations, the processing device may transmit a notification indicating the second output values satisfy the threshold.

Figure 7:
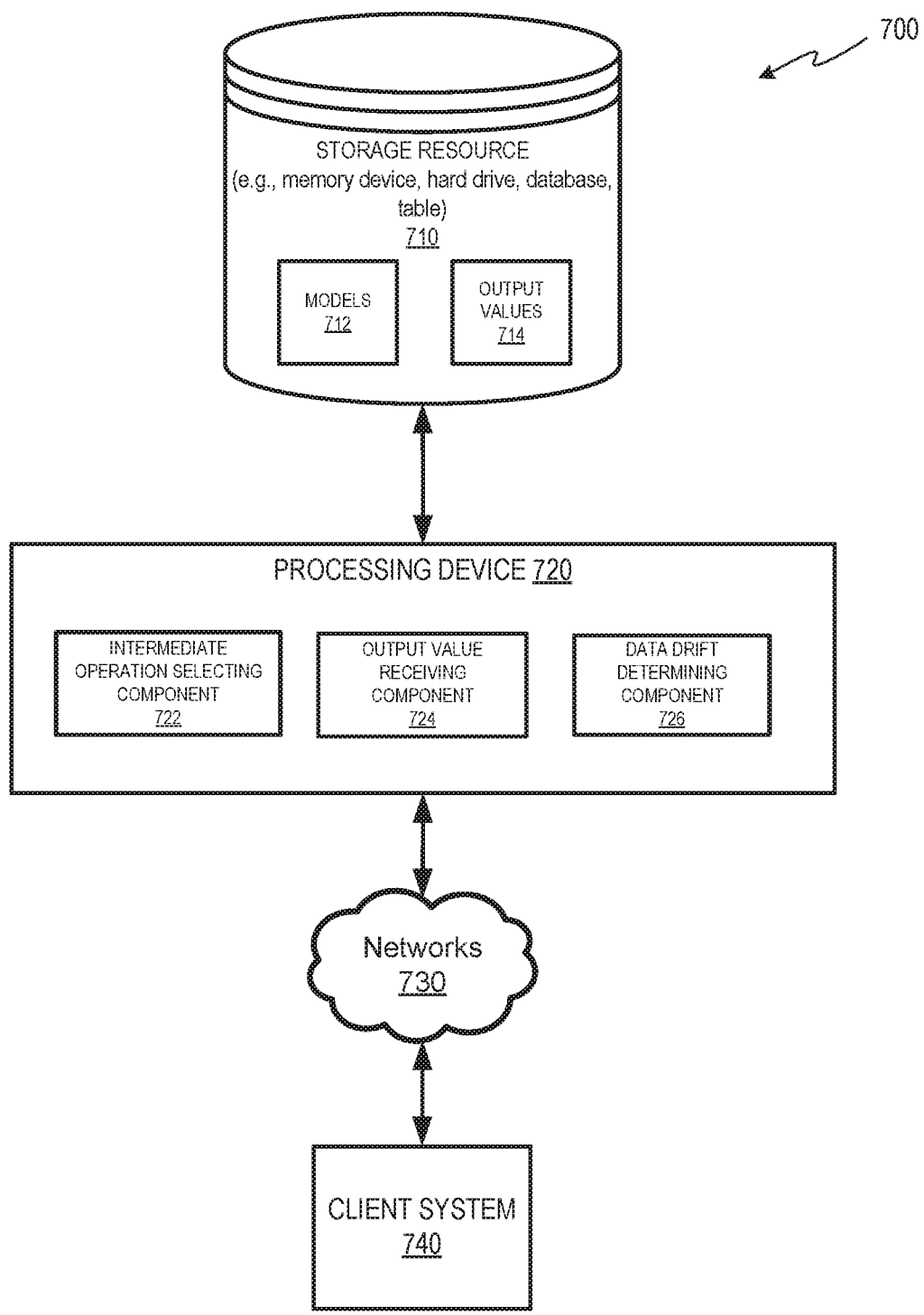
FIG. 7 illustrates an example apparatus in which implementations of the disclosure may operate.

FIG. 7 illustrates an example apparatus 700 in which implementations of the disclosure may operate. The apparatus 700 may be the same or similar to one of the distributed computing system, a network, or other computing devices. The storage resource 710 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 710 may store information, (such as models 712 and output values 714). The processing device 720 may be communicatively coupled to a client system 740 via a network 730. The client system 740 and the network 730 may correspond to client system 120 and network 140 of FIG. 1, respectively.

The apparatus 700 may include a processing device 720. The processing device 720 may include an intermediate operation selecting component 722, an output value receiving component 724, and a data drift determining component 726.

The intermediate operation selecting component 722 may select the intermediate operation of the models to provide output values. In some implementations, the intermediate operation selecting component 722 may select multiple intermediate operations of one or more models to provide output values. In other implementations, the intermediate operation selecting component 722 may modify the source code of the selected intermediate operations to provide output values. The output value receiving component 724 may receive the output values for the intermediate operations. The output value receiving component 724 may also store the output values on storage resource 710. The data drift determining component 726 may identify data drift of a model in view of received output values of an intermediate operation of the model. The data drift determining component 726 may also generate and transmit a notification indicating data drift of the models in view of the difference between output values of the intermediate operations satisfying corresponding thresholds. The data drift determining component 726 may further identify the owner of a model and provide the notification to a client device (e.g., client system 740) associated with the owner of the model.

Figure 8:
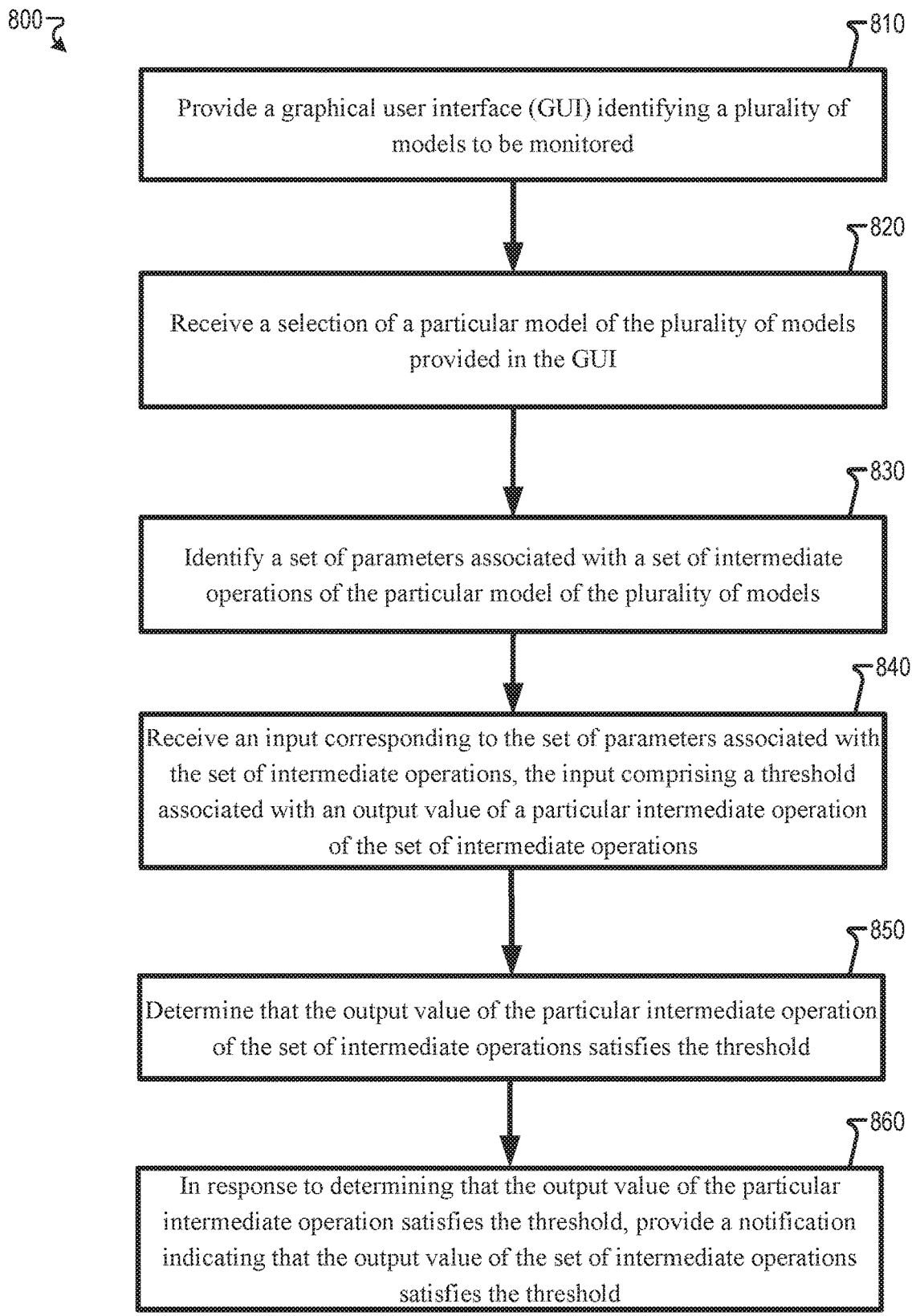
FIG. 8 depicts a flow diagram of an example method to provide a graphical user interface (GUI) for receiving inputs corresponding to parameters associated with a set of intermediate operations according to an implementation of the disclosure.

FIG. 8 depicts a flow diagram of an example method 800 to provide a GUI for receiving inputs corresponding to parameters associated with a set of intermediate operations. The method 800 may be performed by a processing device that may include hardware (e.g., processing logic, circuitry, dedicated logic, programmable logic, microcode, etc.), software (e.g., instructions run or executed on a processing device), or a combination thereof. In general, the method 800 may be performed by the data drift detector component 112 of FIG. 1.

Method 800 may begin with a processing device providing a GUI identifying a plurality of models to be monitored (block 810). For example, the processing device may provide the GUI to a client device, such as client system 120 of FIG. 1. The GUI may consist of selectable icons, drop down menus, identifiers or the like to identify the individual models. The processing device may then receive a selection of a particular model of the plurality of models that are provided in the GUI (block 820). For example, a client device may select a particular model from a drop down menu presented in the GUI. In some implementations, the processing device may authenticate the client device associated with the selection of the particular model. For example, the processing device may authenticate the client device by determining the client device is associated with an owner of the particular model that was selected. Upon receiving the selection, the processing device may identify a set of parameters associated with a set of intermediate operations of the particular model of the plurality of models (block 830). The set of parameters may correspond to measurable values of the set of intermediate operations. In some implementations, the set of parameters may be identified in view of a determined category of the model selected at block 820. For example, if the selected model is a decision tree model and the intermediate operations are decision blocks, then the set of parameters may correspond to the different paths (e.g., yes or no values) of the decision block.

Subsequently, the processing device may receive an input corresponding to the set of parameters associated with the set of intermediate operations (block 840). The received input may correspond to a threshold associated with an output value of a particular intermediate operation of the set of intermediate operations. Using the previous example, the received input may correspond to the different paths of the decision block and the threshold may be associated with the yes or no values of the decision block. For example, the threshold may correspond to a number of yes values for the particular decision block. The processing device may then determine that the output value of the particular intermediate operation of the set of intermediate operations satisfies the threshold (block 850). For example, the processing device may determine that the number of yes values for the particular decision block is greater than the threshold received at block 840. In one implementation, the processing device may determine that the output value satisfies the threshold based on received output values that are associated with the execution of the set of intermediate operations. For example, the received output values may correspond to output values of the set of intermediate operations during the execution of a training set on a model and during the implementation of the model.

The processing device may then provide a notification indicating that the output value of the set of intermediate operations satisfies the threshold (block 860). For example, the processing device may send an email or text message indicating the output value satisfies the threshold. In an implementation, the processing device may determine a set of users associated with the model that includes the set of intermediate operations. For example, the processing device may determine a particular group owns the model. Accordingly, the processing device may provide the notification to client devices associated with the particular group. In some implementations, the processing device may receive a second input corresponding to the set of parameters. The input may include a second threshold associated with a second output value of the set of intermediate operations. The processing device may then determine that the second output value satisfies the second threshold and provide a second notification indicating that the second output value satisfies the second threshold.

Figure 9:
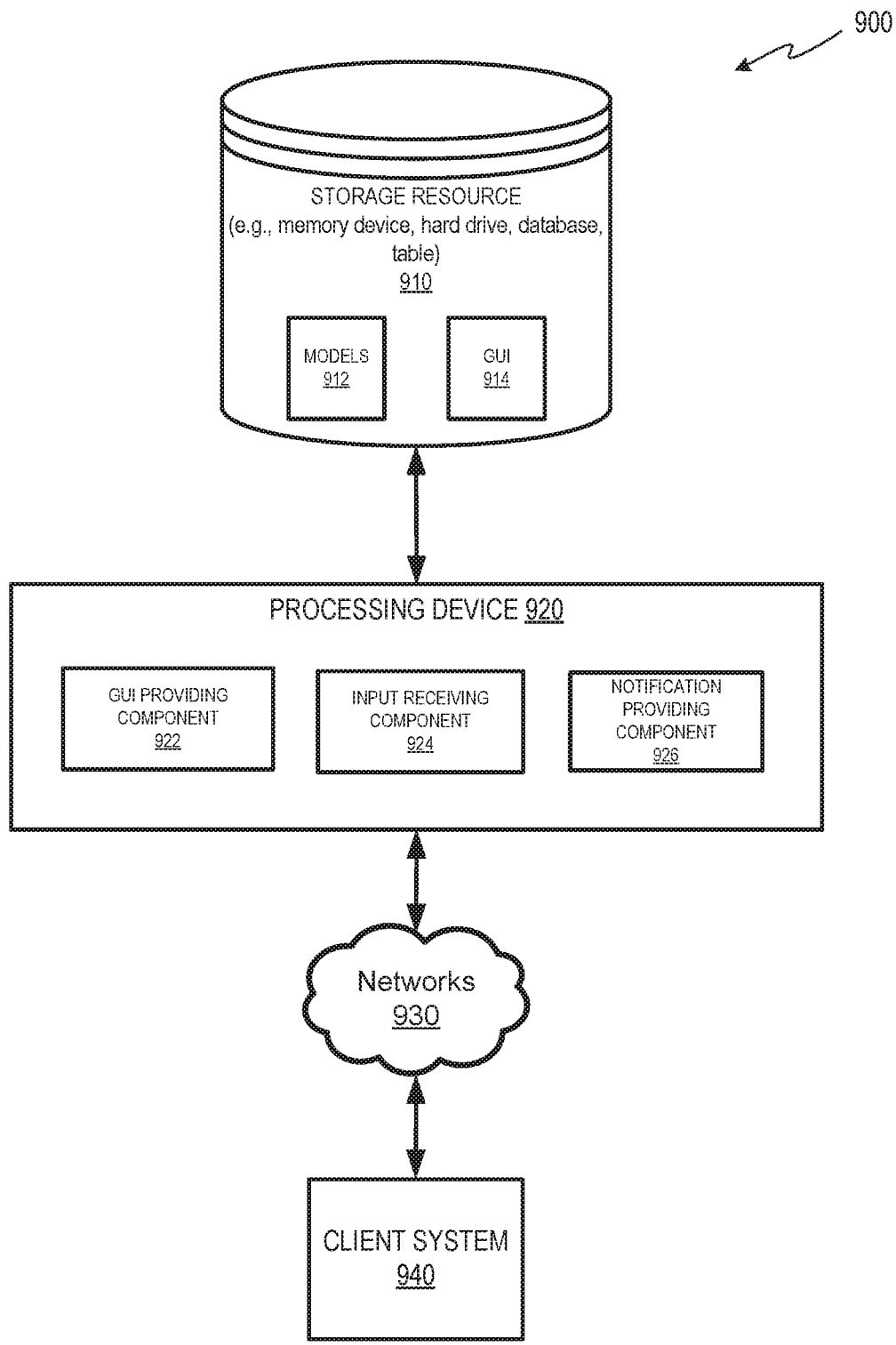
FIG. 9 illustrates an example apparatus in which implementations of the disclosure may operate.

FIG. 9 illustrates an example apparatus 900 in which implementations of the disclosure may operate. The apparatus 900 may be the same or similar to one of the distributed computing system, a network, or other computing devices. The storage resource 910 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 910 may store information, (such as models 912 and GUI 914). The processing device 920 may be communicatively coupled to a client system 940 via a network 930. The client system 940 and the network 930 may correspond to client system 120 and network 140 of FIG. 1, respectively.

The apparatus 900 may include a processing device 920. The processing device 920 may include a GUI providing component 922, an input receiving component 924, and a notification providing component 926.

The GUI providing component 922 may provide a GUI that identifies a plurality of models. The input receiving component 924 may receive a selection of a particular model of the plurality of models identified in the GUI. The input receiving component 924 may also receive one or more inputs corresponding to a set of parameters associated with a set of intermediate operations of the particular model. The notification providing component 926 may provide a notification indicating that the output values associated with a particular intermediate operation satisfy a threshold. The notification providing component 926 may also determine a set of users associated with the particular model and provide the notification to client devices (e.g., client system 940) associated with the set of users.

Figure 10:
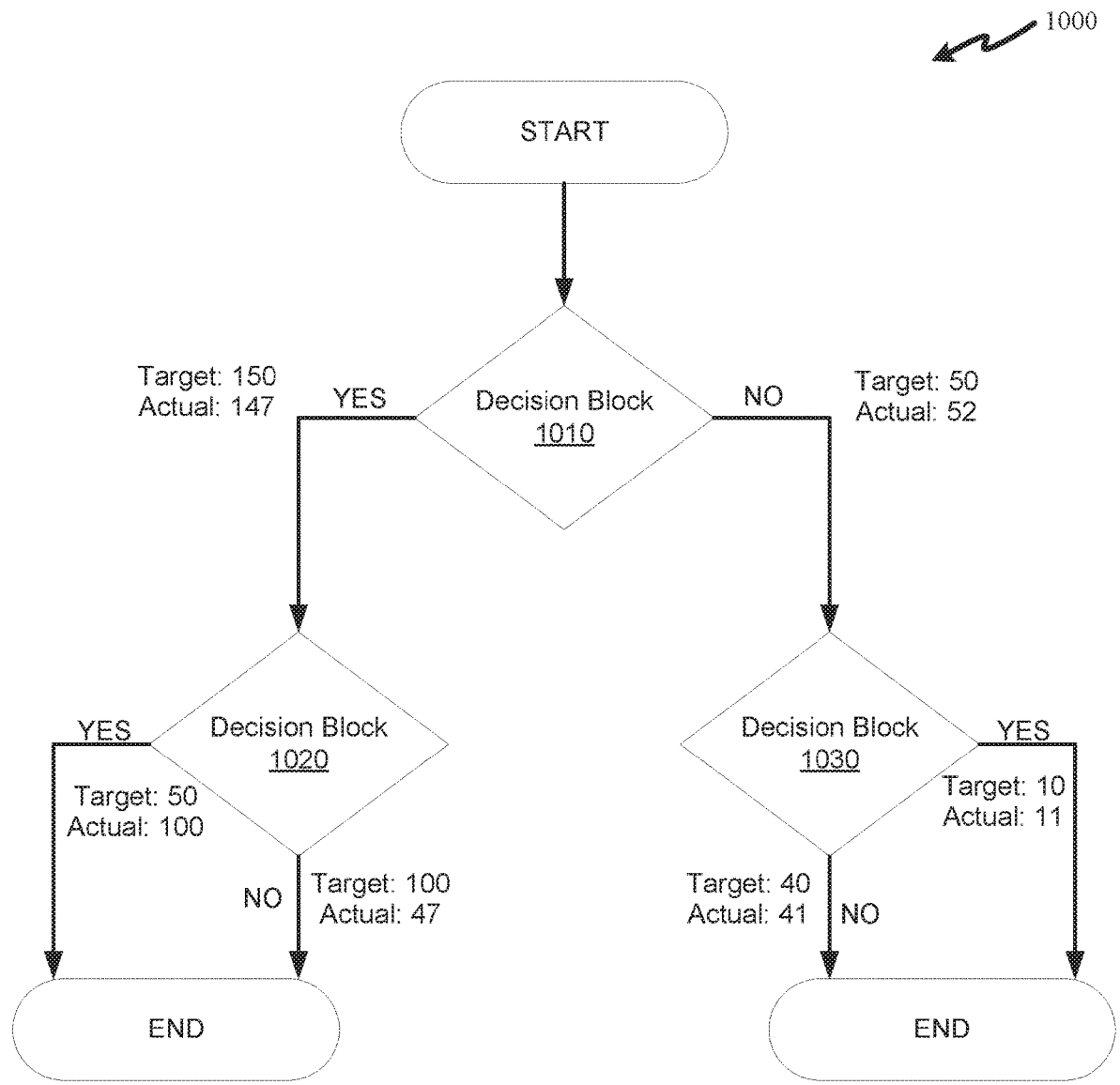
FIG. 10 is an illustration of determining whether an intermediate operation of a model satisfies a threshold, according to implementations.

FIG. 10 is an illustration 1000 of determining whether an intermediate operation of a model satisfies a threshold, according to implementations. Illustration 1000 may include decision blocks 1010, 1020, 1030 of a selected decision tree model. In illustration 1000, decision blocks 1010, 1020, 1030 may have been previously selected to provide output values (e.g., yes or no values). Each of decision blocks 1010, 1020, 1030 may have a corresponding set of target values (e.g., expected values) as well as a corresponding set of actual values (e.g., real world values) that are received by a processing device. Each of decision blocks 1010, 1020, 1030 may have two different paths (e.g., a yes or a no) which are determined in view of the decision received at decision blocks 1010, 1020, 1030. Each of decision blocks 1010, 1020, 1030 may also have thresholds that are associated with the difference between the target value and the actual value for each of the paths.

Decision block 1010 may have a threshold value of 10, which may correspond to the difference between the target value and the actual value for each of the paths. As can be seen by inspection of FIG. 10, the YES path of decision block 1010 has a target value of 150 and an actual value of 147. Accordingly, the YES path of decision block 1010 does not satisfy the threshold value of 10 because the difference between target value and actual value (e.g., 3) is less than the threshold value. Similarly, the NO path of decision block 1010 has a target value of 50 and an actual value of 52. Accordingly, the NO path of decision block 1010 also does not satisfy the threshold value of 10 because the difference between the target value and actual value (e.g., 2) is less than the threshold value.

Decision block 1020 may have a threshold value of 40. As can be seen by inspection of FIG. 10, the YES path of decision block 1020 has a target value of 50 and an actual value of 100. Accordingly, the YES path of decision block 1020 satisfies the threshold value of 40 because the difference between the target value and actual value (e.g., 50) is greater than the threshold value. Similarly, the NO path of decision block 1020 has a target value of 100 and an actual value of 47. Accordingly, the NO path of decision block 1020 satisfies the threshold value of 40 because the difference between the target value and actual value (e.g., 53) is greater than the threshold value. In some implementations, a processing device may determine that the model is experiencing data drift in view of the output values (e.g., yes or no values) of decision block 1020 satisfying the threshold.

In other implementations, the processing device may transmit a notification indicating the output values satisfy the threshold.

Decision block 1030 may have a threshold value of 20. As can be seen by inspection of FIG. 10, the YES path of decision block 1030 has a target value of 10 and an actual value of 11. Accordingly, the YES path of decision block 1030 does not satisfy the threshold value of 20 because the difference between the target value and actual value (e.g., 1) is less than the threshold value. Similarly, the NO path of decision block 1030 has a target value of 40 and an actual value of 41. Accordingly, the NO path of decision block 1030 also does not satisfy the threshold value of 20 because the difference between the target value and actual value (e.g., 1) is less than the threshold value.

Figure 11:
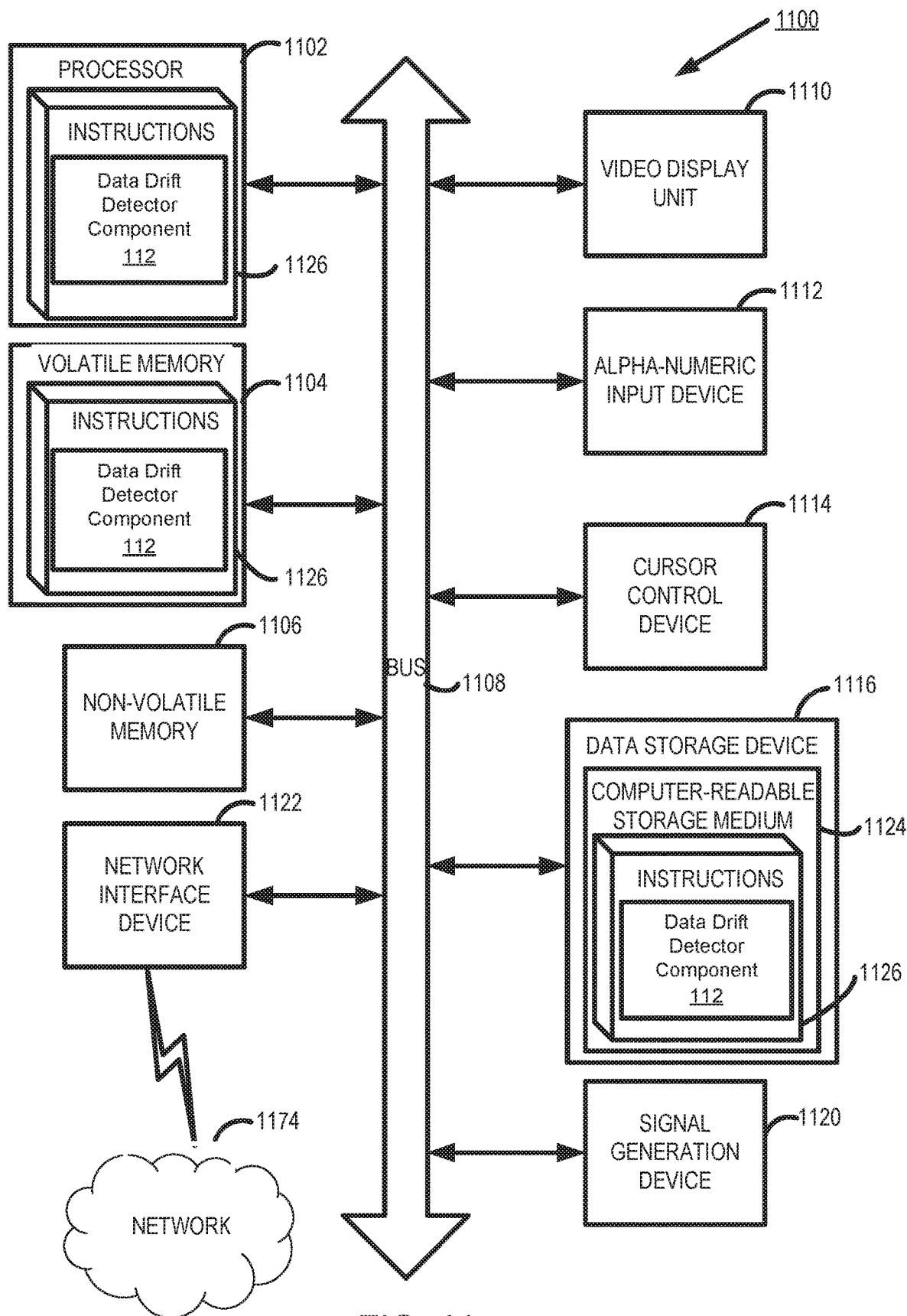
FIG. 11 depicts a block diagram of a computer system operating in accordance with one or more aspects of the present disclosure.

FIG. 11 depicts a block diagram of a computer system operating in accordance with one or more aspects of the present disclosure. In various illustrative examples, computer system 1100 may correspond to a computing device within system architecture 100 of FIG. 1. The computer system 1100 may host the server system 110.

In certain implementations, computer system 1100 may be connected (e.g., via a network, such as a Local Area Network (LAN), an intranet, an extranet, or the Internet) to other computer systems (e.g., client system 120). Computer system 1100 may operate in the capacity of a server or a client computer in a client-server environment, or as a peer computer in a peer-to-peer or distributed network environment. Computer system 1100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1100 may include a processing device 1102, a volatile memory 1104 (e.g., random access memory (RAM)), a non-volatile memory 1106 (e.g., read-only memory (ROM) or electrically-erasable programmable ROM (EEPROM)), and a data storage device 1116, which may communicate with each other via a bus 1108.

Processing device 1102 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1100 may further include a network interface device 1122. Computer system 1100 also may include a video display unit 1110 (e.g., an LCD), an alphanumeric input device 1112 (e.g., a keyboard), a cursor control device 1114 (e.g., a mouse), and a signal generation device 1120.

Data storage device 1116 may include a non-transitory computer-readable storage medium 1124 on which may store instructions 1126 encoding any one or more of the methods or functions described herein, including instructions encoding the data drift detector component 112 of FIG. 1 for implementing methods 200, 400, 600 or 800.

Instructions 1126 may also reside, completely or partially, within volatile memory 1104 and/or within processing device 1102 during execution thereof by computer system 1100, hence, volatile memory 1104 and processing device 1102 may also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, aspects of the present disclosure refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, 600, 800 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Example 1 is a method comprising: identifying a model comprising a plurality of intermediate operations; selecting an intermediate operation of the plurality of intermediate operations to provide output values associated with the plurality of intermediate operations during execution of the model; receiving a first output value associated with the intermediate operation during a first execution of the model; receiving a second output value associated with the intermediate operation during a second execution of the model; determining that a difference between the first output value and the second output value satisfies a threshold; and in response to determining that the difference between the first output value and the second output value satisfies the threshold, transmitting, by a processing device, a notification indicating data drift of the model in view of the difference between the first output value and the second output value satisfies the threshold.

Example 2 is the method of Example 1, further comprising: determining a type of the intermediate operation; and determining the threshold in view of the type of the intermediate operation, wherein determining that the difference between the first output value and the second output value satisfies the threshold is in response to determining the threshold in view of the type of the intermediate operation.

Example 3 is the method of Example 1, further comprising: receiving an input corresponding to the threshold associated with the difference between the first output value and the second output value, wherein determining that the difference between the first output value and the second output value satisfies the threshold is in response to receiving the input corresponding to the threshold.

Example 4 is the method of Example 1, further comprising: selecting a second intermediate operation of the plurality of intermediate operations to provide output values associated with the second intermediate operation of the plurality of intermediate operations in response to the execution of the model; receiving a third output value associated with a first execution of the second intermediate operation of the plurality of intermediate operations; receiving a fourth output value associated with a second execution of the second intermediate operation of the plurality of intermediate operations; determining that a second difference between the third output value and the fourth output value satisfies a second threshold; and in response to determining that the second difference between the third output value and the fourth output value satisfies the second threshold, transmitting a second notification indicating that the second difference between the third output value and the fourth output value satisfies the second threshold.

Example 5 is the method of Example 1, wherein the first output value of the intermediate operation associated with the first execution of the intermediate operation corresponds to an execution of a training set on the model comprising the plurality of intermediate operations.

Example 6 is the method of Example 5, wherein determining the difference between the first output value and the second output value satisfies the threshold comprises: generating a first vector associated with the first output value of the intermediate operation; generating a second vector associated with the second output value of the intermediate operation; and determining that a distance between the first vector and the second vector satisfies the threshold.

Example 7 is the method of Example 1, wherein determining the difference between the first output value and the second output value satisfies the threshold comprises: determining a probability value associated with the first output value and the second output value satisfies the threshold.

Example 8 is a system comprising: a memory; and a processing device operatively coupled with the memory to: receive, for a plurality of models, output values associated with at least one intermediate operation for each model of the plurality of models; generate metric data for each model of the plurality of models in view of the received output values; provide a graphical user interface (GUI) identifying each model of the plurality of models; receive a selection of a particular model of the plurality of models provided in the GUI; identify respective metric data associated with the particular model of the plurality of models; and provide the respective metric data associated with the particular model in the GUI.

Example 9 is the system of Example 8, wherein respective metric data comprises a first set of information and wherein the first set of information is determined in view of a type of the particular model of the plurality of models.

Example 10 is the system of Example 8, wherein to generate the metric data for each model of the plurality of models in view of the received output values, the processing device is further to: generate a vector associated with the received output values for a corresponding model of the plurality of models.

Example 11 is the system of Example 8, wherein to generate the metric data for each model of the plurality of models in view of the received output values, the processing device is further to: generate a probability value associated with the received output values for a corresponding model of the plurality of models.

Example 12 is the system of Example 8, wherein to present the respective metric data associated with the particular model in the GUI, the processing device is further to: present an operational status of the particular model in the GUI.

Example 13 is the system of Example 12, wherein the processing device is further to: receive an input corresponding to the particular model via the GUI, the input comprising a threshold associated with the respective metric data of the particular model, wherein presenting the operational status of the particular model in the GUI is in view of the respective metric data satisfying the threshold.

Example 14 is the system of Example 8, wherein the processing device is further to: authenticate a device associated with the selection of the particular model of the plurality of models present in the GUI, wherein presenting the respective metric data associated with the particular model in the GUI is in response to authenticating the device associated with the selection of the particular model.

Example 15 is a non-transitory computer-readable storage medium comprising instructions that, when executed by a processing device, cause the processing device to: identify a first model comprising a first plurality of intermediate operations; select a first set of intermediate operations of the first plurality of intermediate operations to provide first output values associated with the first set of intermediate operations of the first plurality of intermediate operations during execution of the first model; receive the first output values of the first set of intermediate operations associated with the execution of the first model; determine whether the first model is experiencing data drift in view of the first output values of the first set of intermediate operations; identify a second model comprising a second plurality of intermediate operations; select a second set of intermediate operations of the second plurality of intermediate operations to provide second output values associated with the second set of intermediate operations of the second plurality of intermediate operations during execution of the second model, the second set of intermediate operations being different than the first set of intermediate operations; receive the second output values of the second set of intermediate operations associated with the execution of the second model; and determine whether the second model is experiencing data drift in view of the second output values of the second set of intermediate operations.

Example 16 is the non-transitory computer-readable storage medium of Example 15, wherein the processing device is further to: determine that the first output values of the first set of intermediate operations satisfy a first threshold; and in response to determining that the first output values of the first set of intermediate operations satisfy the first threshold, transmit a first notification indicating that the first output values satisfy the first threshold.

Example 17 is the non-transitory computer-readable storage medium of Example 16, wherein the processing device is further to: determine a first type of the first set of intermediate operations; and determine the first threshold in view of the type of the first set of intermediate operations, wherein determining the first output values of the first set of intermediate operations satisfy the first threshold is in response to determining the first threshold in view of the type of the first set of intermediate operations.

Example 18 is the non-transitory computer-readable storage medium of Example 15, wherein the processing device is further to: determine that the second output values of the second set of intermediate operations satisfy a second threshold; and in response to determining that the second output values of the second set of intermediate operations satisfy the second threshold, transmit a second notification indicating that the second output values satisfy the second threshold.

Example 19 is the non-transitory computer-readable storage medium of Example 15, wherein the selection of the first set of intermediate operations is in view of a first category of the first model and wherein the selection of the second set of intermediate operations is in view of a second category of the second model.

Example 20 is the non-transitory computer-readable storage medium of Example 15, wherein at least one output value of the first output values associated with the first set of intermediate operations corresponds to an execution of a training set on the first model comprising the first plurality of intermediate operations.

Example 21 is a method comprising: providing a graphical user interface (GUI) identifying a plurality of models to be monitored; receiving a selection of a particular model of the plurality of models provided in the GUI; identifying a set of parameters associated with a set of intermediate operations of the particular model of the plurality of models; receiving an input corresponding to the set of parameters associated with the set of intermediate operations, the input comprising a threshold associated with an output value of a particular intermediate operation of the set of intermediate operations; determining, by a processing device, that the output value of the particular intermediate operation of the set of intermediate operations satisfies the threshold; and in response to determining that the output value of the particular intermediate operation satisfies the threshold, providing a notification indicating that the output value of the set of intermediate operations satisfies the threshold.

Example 22 is the method of Example 21, further comprising: receiving output values associated with executions of the set of intermediate operations, wherein determining the at least one output value of the set of intermediate operations satisfies the threshold is in response to receiving the output values associated with the executions of the set of intermediate operations.

Example 23 is the method of Example 21, where providing the notification indicating the at least one output value of the set of intermediate operations satisfies the threshold comprises: determining a set of users associated with the particular model comprising the set of intermediate operations; and providing the notification indicating that the output value of the set of intermediate operations satisfies the threshold to the determined set of users associated with the particular model.

Example 24 is the method of Example 21, further comprising: receiving a second input corresponding to the set of parameters associated with the set of intermediate operations, the input comprising a second threshold associated with a second output value of the set of intermediate operations; determining that the second output value of the set of intermediate operations satisfies the second threshold; and in response to determining that the output value of the set of intermediate operations satisfies the threshold, providing a second notification indicating that the second output value of the set of intermediate operations satisfies the second threshold.

Example 25 is the method of Example 21, further comprising: authenticating a device associated with the selection of the particular model of the plurality of models present in the GUI, wherein identifying the set of parameters associated with the set of intermediate operations of the particular model is in response to authenticating the device associated with the selection of the particular model.

Example 26 is the method of Example 21, wherein the identifying a set of parameters associated with a set of intermediate operations of the particular model of the plurality of models comprises: determining a category of the particular model of the plurality of models, wherein the set of parameters associated with the set of intermediate operations is identified in view of the determined category of the particular model.

Example 27 is an apparatus comprising: a processing device; means for identifying a model comprising a plurality of intermediate operations; means for selecting an intermediate operation of the plurality of intermediate operations to provide output values associated with the plurality of intermediate operations during execution of the model; means for receiving a first output value associated with the intermediate operation during a first execution of the model; means for receiving a second output value associated with the intermediate operation during a second execution of the model; means for determining that a difference between the first output value and the second output value satisfies a threshold; and means for transmitting a notification indicating data drift of the model in view of the difference between the first output value and the second output value satisfies the threshold.

Example 28 is the apparatus of Example 27, further comprising: determining a type of the intermediate operation; and determining the threshold in view of the type of the intermediate operation, wherein determining that the difference between the first output value and the second output value satisfies the threshold is in response to determining the threshold in view of the type of the intermediate operation.

Example 29 is the apparatus of Example 27, further comprising: receiving an input corresponding to the threshold associated with the difference between the first output value and the second output value, wherein determining that the difference between the first output value and the second output value satisfies the threshold is in response to receiving the input corresponding to the threshold.

Example 30 is the apparatus of Example 27, further comprising: selecting a second intermediate operation of the plurality of intermediate operations to provide output values associated with the second intermediate operation of the plurality of intermediate operations in response to the execution of the model; receiving a third output value associated with a first execution of the second intermediate operation of the plurality of intermediate operations; receiving a fourth output value associated with a second execution of the second intermediate operation of the plurality of intermediate operations; determining that a second difference between the third output value and the fourth output value satisfies a second threshold; and in response to determining that the second difference between the third output value and the fourth output value satisfies the second threshold, transmitting a second notification indicating that the second difference between the third output value and the fourth output value satisfies the second threshold.

Example 31 is the apparatus of Example 27, wherein the first output value of the intermediate operation associated with the first execution of the intermediate operation corresponds to an execution of a training set on the model comprising the plurality of intermediate operations.

Example 32 is the apparatus of Example 31, wherein determining the difference between the first output value and the second output value satisfies the threshold comprises: generating a first vector associated with the first output value of the intermediate operation; generating a second vector associated with the second output value of the intermediate operation; and determining that a distance between the first vector and the second vector satisfies the threshold.

Example 33 is the apparatus of Example 27, wherein determining the difference between the first output value and the second output value satisfies the threshold comprises: determining a probability value associated with the first output value and the second output value satisfies the threshold.

What is claimed is:

1. A method comprising:
    identifying a model comprising a plurality of intermediate operations, wherein each intermediate operation of the plurality of intermediate operations produces an intermediate output value for use by the model to generate a predictive output value, wherein the intermediate output value is different from the predictive output value;
    for each of the plurality of intermediate operations, generating, by a processing device, a set of instructions to provide the intermediate output values when the model is executed;
    performing a first execution of the identified model, wherein the first execution refers to an execution of a training set on the model;
    receiving a first intermediate output value associated with a first intermediate operation used to produce a first predictive output value during the first execution of the model, wherein the first intermediate operation implements a decision block, and wherein the first predictive output value represents a number of positive responses associated with the decision block;
    performing a second execution of the identified model, wherein the second execution refers to an execution of the model after the model has been implemented;

receiving a second intermediate output value associated with the first intermediate operation used to produce a second predictive output value during the second execution of the model;

determining that a difference between the first intermediate output value and the second intermediate output value satisfies a threshold number of positive responses associated with the decision block; and in response to determining that the difference between the first intermediate output value and the second intermediate output value satisfies the threshold, transmitting, by the processing device, a notification indicating data drift of the model in view of the difference between the first intermediate output value and the second intermediate output value satisfies the threshold.

2. The method of claim 1, further comprising:

determining a type of the first intermediate operation; and determining the threshold in view of the type of the first intermediate operation, wherein determining that the difference between the first intermediate output value and the second intermediate output value satisfies the threshold is in response to determining the threshold in view of the type of the first intermediate operation.

3. The method of claim 1, further comprising:

receiving an input corresponding to the threshold associated with the difference between the first intermediate output value and the second intermediate output value, wherein determining that the difference between the first intermediate output value and the second intermediate output value satisfies the threshold is in response to receiving the input corresponding to the threshold.

4. The method of claim 1, further comprising:

receiving a third intermediate output value associated with a first execution of a second intermediate operation of the plurality of intermediate operations;

receiving a fourth intermediate output value associated with a second execution of the second intermediate operation of the plurality of intermediate operations;

determining that a second difference between the third intermediate output value and the fourth intermediate output value satisfies a second threshold; and in response to determining that the second difference between the third intermediate output value and the fourth intermediate output value satisfies the second threshold, transmitting a second notification indicating that the second difference between the third intermediate output value and the fourth intermediate output value satisfies the second threshold.

5. The method of claim 1, wherein the first intermediate output value of the first intermediate operation associated with the first execution of the first intermediate operation corresponds to an execution of a training set on the model comprising the plurality of intermediate operations.

6. The method of claim 5, wherein determining the difference between the first intermediate output value and the second intermediate output value satisfies the threshold comprises:

generating a first vector associated with the first intermediate output value of the first intermediate operation;

generating a second vector associated with the second intermediate output value of the first intermediate operation; and determining that a distance between the first vector and the second vector satisfies the threshold.

7. The method of claim 1, wherein determining the difference between the first intermediate output value and the second intermediate output value satisfies the threshold comprises:

determining a probability value associated with the first intermediate output value and the second intermediate output value satisfies the threshold.

8. A system comprising:

a memory; and a processing device operatively coupled with the memory to:

performing a first execution on a plurality of models, wherein the first execution refers to an execution of a training set on the plurality of models;

receive, for the plurality of models, first intermediate output values associated with at least one intermediate operation used to produce first predictive output values, wherein each model of the plurality of models include a set of instructions to provide the first intermediate output values associated with at least one intermediate operation when the model is executed, wherein the intermediate operation implements a decision block, wherein the first predictive output values represent a number of positive response associated with the decision block, and wherein the first intermediate output values is different from the first predictive output values;

generate metric data for each model of the plurality of models in view of the received first intermediate output values;

provide a graphical user interface (GUI) identifying each model of the plurality of models;

receive a selection of a particular model of the plurality of models provided in the GUI;

performing a second execution on of the particular model, wherein the second execution refers to an execution of the particular model after the particular model has been implemented;

identify respective metric data associated with the particular model of the plurality of models; and provide the respective metric data associated with the particular model in the GUI.

9. The system of claim 8, wherein respective metric data comprises a first set of information and wherein the first set of information is determined in view of a type of the particular model of the plurality of models.

10. The system of claim 8, wherein to generate the metric data for each model of the plurality of models in view of the received first intermediate output values, the processing device is further to:

generate a vector associated with the received first intermediate output values for a corresponding model of the plurality of models.

11. The system of claim 8, wherein to generate the metric data for each model of the plurality of models in view of the received first intermediate output values, the processing device is further to:

generate a probability value associated with the received first intermediate output values for a corresponding model of the plurality of models.

12. The system of claim 8, wherein to present the respective metric data associated with the particular model in the GUI, the processing device is further to:

present an operational status of the particular model in the GUI.

13. The system of claim 12, wherein the processing device is further to:

receive an input corresponding to the particular model via the GUI, the input comprising a threshold associated with the respective metric data of the particular model, wherein presenting the operational status of the particular model in the GUI is in view of the respective metric data satisfying the threshold.

14. The system of claim 8, wherein the processing device is further to:
authenticate a device associated with the selection of the particular model of the plurality of models present in the GUI, wherein presenting the respective metric data associated with the particular model in the GUI is in response to authenticating the device associated with the selection of the particular model.

15. A non-transitory computer-readable storage medium comprising instructions that, when executed by a processing device, cause the processing device to:
identify a first model comprising a first plurality of intermediate operations, wherein each intermediate operation of the first plurality of intermediate operations produces an intermediate output value for use by the model to generate a predictive output value, wherein the intermediate output value is different from the predictive output value;
for each of the first plurality of intermediate operations, generating a set of instructions to provide intermediate output values when the first model is executed;
perform a first execution of the first model, wherein the first execution refers to an execution of a training set on the first model;
receive the first intermediate output values of the first set of intermediate operations associated with the execution of the first model used to produce a first predictive output value, wherein the first set of intermediate operations implements a decision block, and wherein the first predictive output value represents a number of positive responses associated with the decision block;
determine whether the first model is experiencing data drift in view of the first intermediate output values of the first set of intermediate operations;
identify a second model comprising a second plurality of intermediate operations, wherein each intermediate operation of the second plurality of intermediate operations produces an intermediate output value for use by the model to generate a predictive output value, wherein the intermediate output value is different from the predictive output value;
for each of the second plurality of intermediate operations, generating a set of instructions to provide intermediate output values when the second model is executed;
performing a second execution of the second model, wherein the second execution refers to an execution of the second model after the second model has been implemented;
receive the second intermediate output values of the second set of intermediate operations associated with the execution of the second model used to produce a second predictive output value; and
determine whether the second model is experiencing data drift in view of the second intermediate output values of the second set of intermediate operations.

16. The non-transitory computer-readable storage medium of claim 15, wherein the processing device is further to:
determine that the first intermediate output values of the first set of intermediate operations satisfy a first threshold; and
in response to determining that the first intermediate output values of the first set of intermediate operations satisfy the first threshold, transmit a first notification indicating that the first intermediate output values satisfy the first threshold.

17. The non-transitory computer-readable storage medium of claim 16, wherein the processing device is further to:
determine a first type of the first set of intermediate operations; and
determine the first threshold in view of the type of the first set of intermediate operations, wherein determining the first intermediate output values of the first set of intermediate operations satisfy the first threshold is in response to determining the first threshold in view of the type of the first set of intermediate operations.

18. The non-transitory computer-readable storage medium of claim 15, wherein the processing device is further to:
determine that the second intermediate output values of the second set of intermediate operations satisfy a second threshold; and
in response to determining that the second intermediate output values of the second set of intermediate operations satisfy the second threshold, transmit a second notification indicating that the second intermediate output values satisfy the second threshold.

19. The non-transitory computer-readable storage medium of claim 15, wherein a selection of the first set of intermediate operations is in view of a first category of the first model and wherein the selection of the second set of intermediate operations is in view of a second category of the second model.

20. The non-transitory computer-readable storage medium of claim 15, wherein at least one intermediate output value of the first intermediate output values associated with the first set of intermediate operations corresponds to an execution of a training set on the first model comprising the first plurality of intermediate operations.

* * * * *